Nov. 4, 1924.  1,513,874

M. J. UFFORD

WAVE MOTOR

Filed Dec. 29, 1923   2 Sheets-Sheet 1

Inventor
M. J. Ufford

By Watson E. Coleman
Attorney

Nov. 4, 1924.
M. J. UFFORD
WAVE MOTOR
Filed Dec. 29, 1923
1,513,874
2 Sheets-Sheet 2
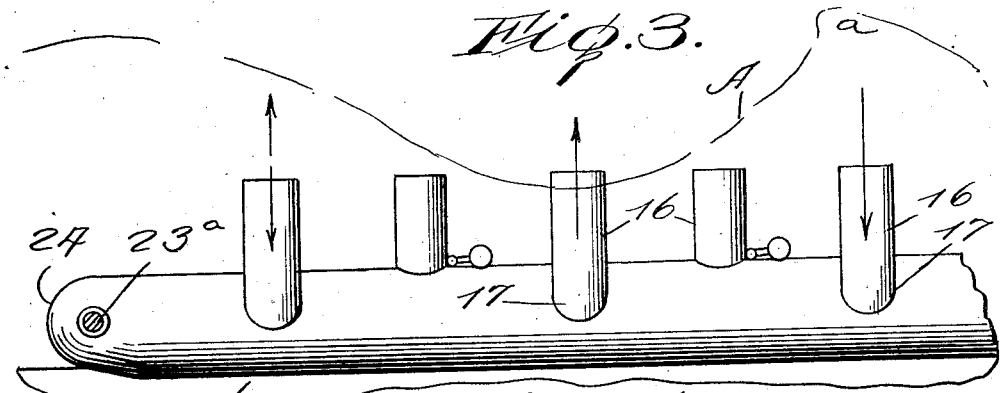
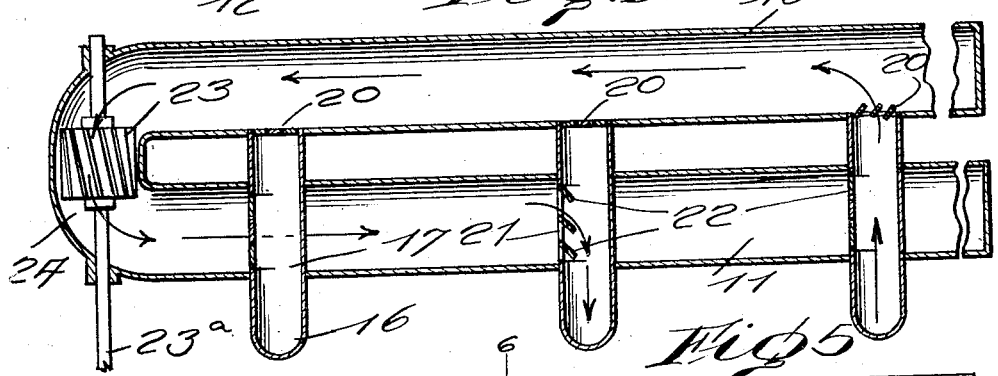
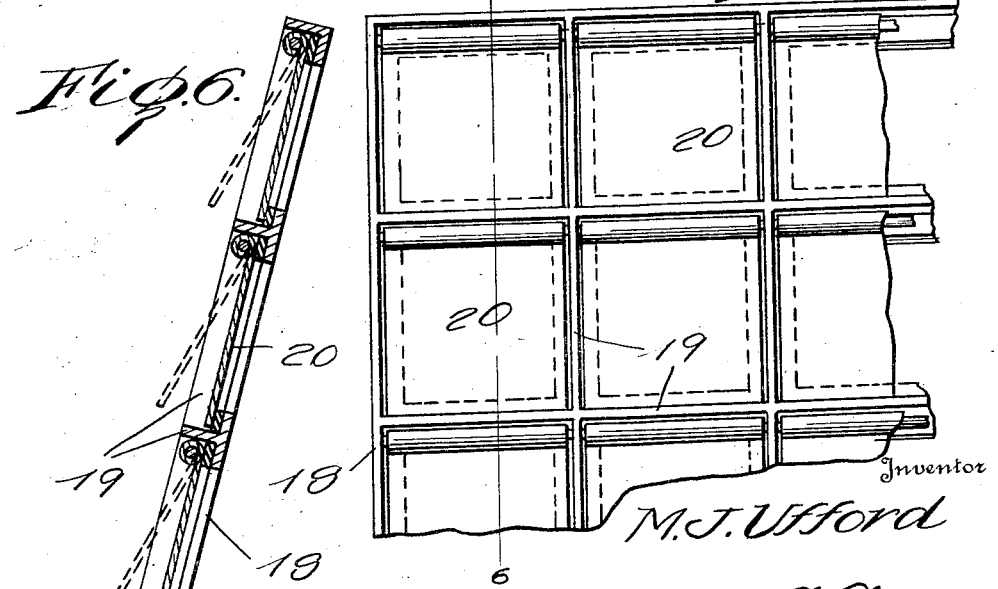
Inventor
M. J. Ufford
By Watson E. Coleman
Attorney Patented Nov. 4, 1924.

1,513,874

UNITED STATES PATENT OFFICE.

MORRELL J. UFFORD, OF UPLAND, CALIFORNIA.

WAVE MOTOR.

Application filed December 29, 1923. Serial No. 683,460.

*To all whom it may concern:*

Be it known that I, MORRELL J. UFFORD, a citizen of the United States, residing at Upland, in the county of San Bernardino and State of California, have invented certain new and useful Improvements in Wave Motors, of which the following is a specification, reference being had to the accompanying drawings.

This invention relates to wave motors, or in other words means for securing power from wave motion in water, and particularly to that class of wave motors wherein the water from the crests of the waves is used to secure a head of water to operate a turbine or other water-operated motor.

One of the objects of this invention is to provide a construction of this character so designed that power will be secured from the crests of a plurality of waves.

A further object is to provide a construction of this character wherein there is used an inlet pipe and an outlet or return pipe, there being a water motor located at any desired point in the inlet pipe or between the inlet and the outlet pipe, the inlet pipe being provided with a series of vertical receiving pipes, as they may be called, extending up to a height approximately either slightly above or slightly below the average trough of the wave, those receiving pipes which are for any moment below the crests of a plurality of waves conveying water downward into the inlet pipe, thus causing the water in the inlet pipe to be under a pressure equal to the head of water which exists between the troughs of the waves and the crests of the waves, and further in this connection to provide means whereby those receiving pipes which are momentarily located beneath the troughs of several waves shall permit the discharge of water from the return pipe to thereby cause a circulation of water in one direction through the inlet pipe and in the reverse direction through the return pipe and the discharge of this water.

A still further object is to provide a construction of this character wherein valves are provided controlling the passage of water from the receiving pipe into the inlet pipe and the passage of water from the exhaust pipe into each receiving pipe, these valves being so arranged that the valves controlling passage into the inlet pipe will open when the individual receiving pipe is beneath the crest of the wave, while the valves controlling passage into the return pipe or outlet pipe will be closed at this period, and the valves controlling the passage from the penstock into the return pipe will open to permit the flow of water from the return pipe to the receiving pipe when the penstock is immediately beneath the trough of the wave, said valves being further so arranged that when a receiving pipe is in a neutral position neither immediately beneath the crest of a wave nor either slightly above or slightly below the trough of a wave, the valves will remain neutral and both sets of valves remain closed.

Another object is to provide a construction of this character which is adapted to be submerged at a predetermined depth beneath the average level of the troughs of the waves and will rise or fall with the rise or fall of the tide, the means for this purpose including an air chamber or pontoon or equivalent element to which the pipes are operatively connected and by which they are supported, this air chamber or pontoon having means whereby water may be admitted into the interior of the pontoon or air chamber to cause it to sink or whereby the water may be pumped out from the interior to cause the rise of this float or air chamber, this float, air chamber or pontoon being, of course, anchored to a suitable location and there being means whereby the valve for admitting water to the pontoon or float and the pump for discharging water therefrom may be manually controlled.

Other objects will appear in the course of the following description.

My invention is illustrated in the accompanying drawings, wherein:—

Figure 2 is a side elevation of my improved wave motor, one wall of the casing being partly broken away to show a corner of the workroom;

Figure 3 is a diagrammatic elevation illustrating the principle upon which this wave motor operates;

Figure 4 is a diagrammatic horizontal section further illustrating the principle of operation;

Figure 5 is a fragmentary face view of the valves and valve mounting for the inlet and outlet pipes;

Figure 6 is a vertical section through the valves and frame supporting the valves;

Figure 1:
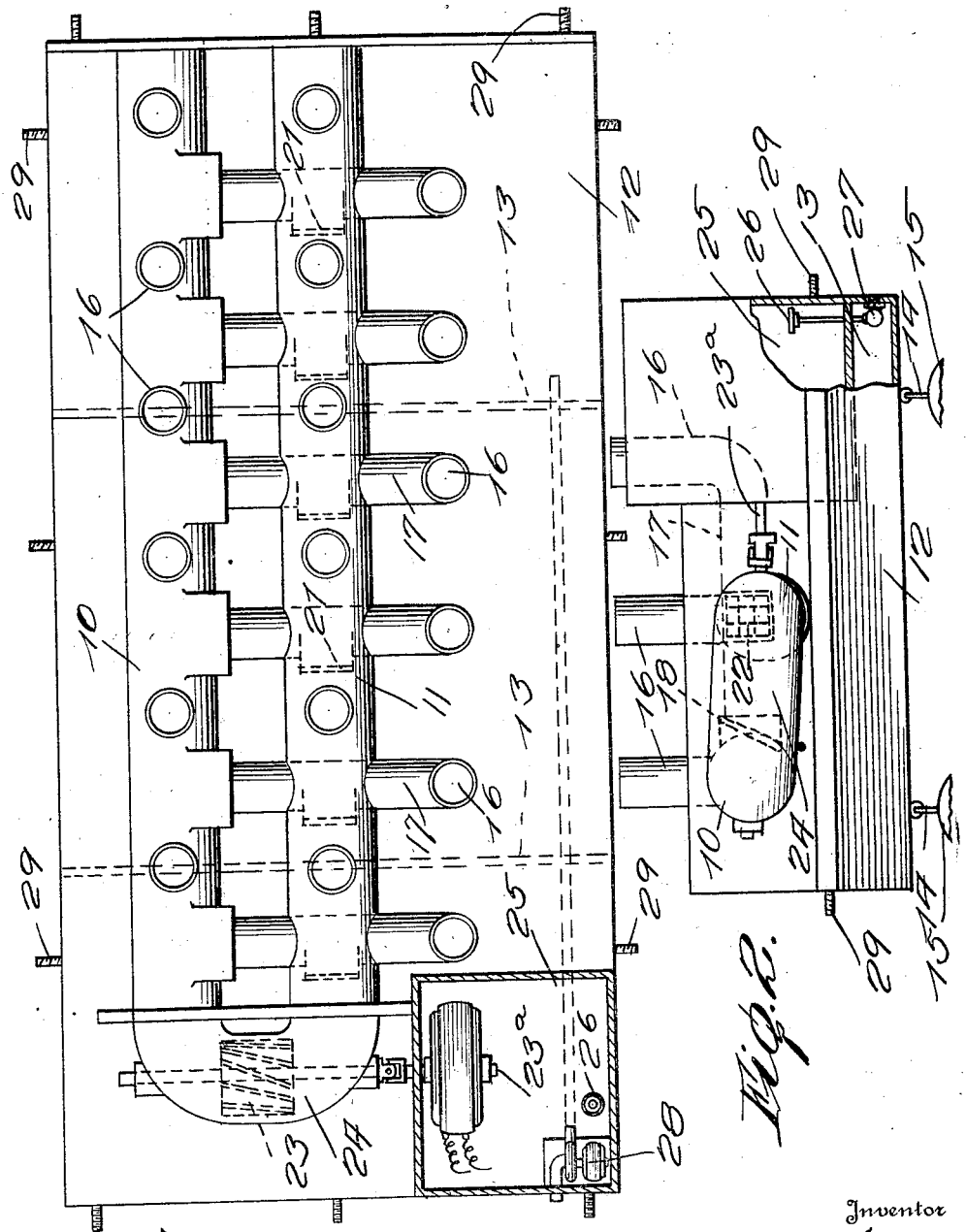
Figure 1 is a diagrammatic top plan view of a wave motor constructed in accordance with my invention.

Referring to these drawings, it will be seen that my wave motor system includes a pair of pipes 10 and 11, the pipe 11 being preferably larger than the pipe 10 for a reason to be hereinafter stated, and the pipe 10 constituting the inlet pipe, while the pipe 11 constitutes the outlet, return or exhaust pipe. These pipes are connected to each other in any suitable manner and are supported upon a pontoon, float or air chamber 12. This has certain water compartments 13 so that by pumping water into the water compartments the float 12 may be caused to sink and by pumping water out of these compartments 13 the float or pontoon may be caused to rise. By this means the buoyancy of the pontoon or float may be so adjusted as to support the pipes 10 and 11 at a predetermined distance below the surface of the water. This float is anchored by means of cables 14 and anchors 15 of any suitable character.

Connected to the pipes 10 and 11 are the receiving pipes 16. These are disposed at any desired distance apart. They may be close together or separated by a number of feet. This makes no difference as regards the principle or operation of my machine. The upper ends of these receiving pipes are open and each receiving pipe extends downward and then curves laterally, as at 17, this portion 17 extending through the exhaust pipe 11 and extending and opening into the inlet pipe 10. The buoyancy of the float or pontoon 12 is such that the upper ends of these receiving pipes 16 will be disposed either slightly below or slightly above the average trough of the wave and will, of course, be disposed several feet below the crest of the wave. Under all circumstances these receiving pipes are disposed with their upper ends either slightly above or below the surface of the trough of the wave and obviously the cables 14 will be sufficiently slack so that as the tide rises the float will move upward and support the receiving pipes still at the same distance relative to the trough of the wave, while as the tide falls the float will sink and support the receiving pipes in this position. In all stages of the tide, therefore, the receiving pipes will be disposed in this position with their mouths or upper ends either slightly below or slightly above the troughs between the several waves.

As before stated, each receiving pipe 16 extends downward and then is curved to provide a portion 17 extending at right angles to the body of the receiving pipe and extending through the pipe 11, which is preferably of larger diameter than the portion 17 of the receiving pipe, this portion 17 extending to and opening into the interior of the inlet pipe 10. At the junction of the portion 17 with the inlet pipe 10 there is provided a frame 18, which frame is formed by intersecting bars 19 to thus form a plurality of seats for a plurality of valves 20 or gates. Each of these valves is hinged at one side in any suitable manner to the frame and closed against a rubber, leather or other gasket forming a seat for the check valve. The frame 18 is disposed at such an angle to the vertical that the check valves 20 will tend to close by gravity but will open upon inrush of water downward through the receiving pipe and laterally through the pipe 17 in the direction of the arrow in Figure 4, permitting this water to pass into the intake pipe 10. Where the portion 17 passes through the outlet or return pipe 11, the portion 17 is likewise provided with a frame 21 formed by intersecting cross bars of exactly the same character as the frame 18, having therein a plurality of valves 22, this frame 21 being disposed at such an angle to the vertical that these valves will tend to close. These valves close inward and open outward.

It will be obvious particularly from Figure 3 that when the crest $a$ of the wave A arrives immediately above a receiving pipe that the head of water between the level of the trough between the waves and the crest $a$ of the wave will cause water to pass downward through the receiving pipe 16 and laterally through the portion 17. This water will be at a relatively greater pressure than the water in the outlet or return pipe 11 and as a consequence this pressure will cause the valves 22 to close. This pressure, however, will cause the valves 20 to open and water, therefore, will rush into the inlet pipe. This will occur at every receiving pipe which at any moment is beneath the crest $a$ of a wave. The water within the inlet pipe will be at a pressure equal to the head of water over each intaking receiving pipe. The water will rush along the inlet pipe 10 and operate a water motor as, for instance, a turbine or wheel 23 which is preferably located adjacent the point of connection 24 between the intake pipe 10 and the pipe 11. The water will then pass along the return pipe 11 and will push open the valves 22 which are associated with each penstock which at that moment is immediately beneath the trough of the wave, as most clearly illustrated in the diagrammatic view in Figure 4, and inasmuch as the water will flow from those receiving pipes having the highest pressure or greatest head above them into the pipe 10, the water will flow out through the pipe 11 into those receiving pipes having the lowest head above them, or in other words those receiving pipes which at any particular moment are beneath the troughs of the waves.

It will be seen from the diagram, Figure 3. that certain of the receiving pipes at any particular moment will neither be beneath the trough of the wave or beneath the crest of the wave and in these penstocks the pressure will be balanced, or in other words neither of the valves 20 or 22 will open but the valves will remain closed and these receiving pipes will be neutral, neither receiving water nor delivering water. As each wave moves onward or as each crest moves onward, the receiving pipe which was before neutral becomes positive in its action, that is receives water, while the next adjacent receiving pipe which was before beneath the trough of a wave becomes neutral, while the receiving pipe which was receiving water becomes negative, that is comes beneath the trough of the wave. Thus at all times there are certain penstocks which are receiving water under pressure of a head equal to the difference between the troughs of the waves and the crests thereof, and there are certain penstocks which are neutral, being between the troughs of the waves and the crests thereof and discharging water through those receiving pipes which are disposed beneath the troughs of the waves. There will hence be a constant passage of circulation of water through the inlet pipe in one direction, past the turbine or other water operated device, and into the outlet or return pipe 11 and so out through certain of the receiving pipes. It will be obvious that the power thus generated may be transmitted to the shore in any suitable manner and used for any desired purpose.

I have illustrated in connection with the pair of pipes 10 and 11 and forming part thereof and supported by the float 12 a workroom 25 into which a shaft 23ᵃ driven by the turbine 23 may be carried and this shaft may be used to generate electricity, which in turn is carried by cables to the shore. Into this workroom extends the handle or operating means 26 of a valve 27 which may be used to admit water to the compartments 13. I have illustrated this valve 27 and its handle 26 in the simplest possible manner but it will be understood that this is designed merely to illustrate that a valve of any construction may be used and I do not wish to be limited to a simple valve of this character. The pump 28 for discharging water from the compartment or compartments 13 may also be located in this workroom, or the motor for driving this pump may be located in the workroom and under the control of the operator in this workroom. Of course, it will be understood that means must be provided for supplying air to this workroom and carrying out foul air. I have not illustrated any such means, however, as the necessity of such means is obvious and the mechanism itself is quite common.

These sections may also have lateral bolts 29 so that another pair of intake and outlet pipes with a corresponding air chamber or float may be connected to the first set. This construction provides for units, each unit consisting of a pair of pipes.

It is to be understood that the outlet pipe 11 is to be larger than the inlet pipe, as illustrated in Figure 4, and as previously referred to at the beginning of this specification so as to permit free movement of the water passing out through the outlet pipe and so that there will be no possible back pressure, thus permitting the water to find the open valves and pass through them and pass by the closed valves. This I regard as a very important part of my invention.

I do not wish to be limited to any of the details illustrated, as these might be varied in many ways without departing from the spirit of the invention.

I claim:—

1. A wave motor including a submerged inlet pipe and a coacting submerged outlet or return pipe, a plurality of receiving pipes disposed at intervals along said pipes, each receiving pipe having an opening into the inlet pipe and an opening into the outlet pipe, an inwardly opening valve opened by pressure in the receiving pipe disposed at the opening of the penstock into the inlet pipe, and an outwardly opening valve opening by pressure in the outlet pipe disposed in the opening between each receiving pipe and the return or outlet pipe.

2. A wave motor including a submerged inlet pipe and a co-acting submerged outlet or return pipe, a plurality of receiving pipes disposed at intervals along said pipes, each receiving pipe opening into the inlet pipe and having an opening leading into the outlet pipe, a plurality of inwardly opening valves opening by pressure in the receiving pipe controlling the passage of liquid from each receiving pipe into the inlet pipe, and a plurality of valves controlling the passage of liquid from the outlet pipe into each receiving pipe, said valves opening to pressure within the outlet pipe, all of said valves being normally closed.

3. A wave motor including a submerged float and a submerged inlet pipe mounted upon the float, a coacting submerged outlet or return pipe also mounted upon the float, a plurality of receiving pipes disposed at intervals along said pipe and supported by the float, each receiving pipe being open at its upper end and extending downward and then laterally through each outlet pipe and opening into the inlet pipe, a valve disposed in said last named opening normally in a closed position but opening by pressure within the receiving pipe, and a valve controlling passage of liquid from the outlet pipe into each receiving pipe, said valve opening inward into the penstock under pressure within the outlet pipe but being held closed by pressure within the receiving pipe greater than the pressure within the outlet pipe.

4. A wave motor of the character described comprising a float adapted to be anchored in a submerged position, means connected to the float whereby the buoyancy of the float may be increased or decreased, a pair of parallel pipes mounted upon the float, each of said pipes being closed at one end, the opposite ends of the pipes being connected to each other, one of said pipes constituting an inlet pipe and the other an outlet pipe, a water motor disposed between the discharge end of the inlet pipe and the inlet end of the outlet pipe, said motor being adapted to be connected to mechanism to be driven, a plurality of receiving pipes carried by the float open at their upper ends and extending downward and then extending through the outlet pipe and opening into the inlet pipe, a plurality of check valves mounted at the discharge end of each receiving pipe and adapted to open inward under pressure into the inlet pipe but normally being closed by gravity, each receiving pipe having an opening into the outlet pipe, and check valves controlling passage through said opening, said check valves opening inward into the penstock but being normally urged to a closed position.

In testimony whereof I hereunto affix my signature.

MORRELL J. UFFORD.